US007953597B2

(12) United States Patent
Ativanichayaphong et al.

(10) Patent No.: US 7,953,597 B2
(45) Date of Patent: May 31, 2011

(54) METHOD AND SYSTEM FOR VOICE-ENABLED AUTOFILL

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 386 days.

(21) Appl. No.: 11/199,672

(22) Filed: Aug. 9, 2005

(65) Prior Publication Data

US 2006/0074652 A1    Apr. 6, 2006

Related U.S. Application Data

(63) Continuation-in-part of application No. 10/945,112, filed on Sep. 20, 2004.

(51) Int. Cl.
*G10L 15/26* (2006.01)
*G06F 17/00* (2006.01)
*G10L 15/00* (2006.01)

(52) U.S. Cl. ......... 704/235; 704/270; 704/275; 715/226

(58) Field of Classification Search .................. 704/235, 704/275; 715/226
See application file for complete search history.

(56) References Cited

U.S. PATENT DOCUMENTS

| 5,619,708 | A | * | 4/1997 | Ho | 715/224 |
|---|---|---|---|---|---|
| 5,642,519 | A | * | 6/1997 | Martin | 704/9 |
| 5,995,918 | A | * | 11/1999 | Kendall et al. | 704/1 |
| 6,058,366 | A | * | 5/2000 | Tarkiainen et al. | 704/270 |
| 6,078,886 | A | * | 6/2000 | Dragosh et al. | 704/270 |
| 6,188,985 | B1 | * | 2/2001 | Thrift et al. | 704/275 |
| 6,199,079 | B1 | * | 3/2001 | Gupta et al. | 715/207 |
| 6,240,448 | B1 | * | 5/2001 | Imielinski et al. | 709/218 |
| 6,314,402 | B1 | * | 11/2001 | Monaco et al. | 704/275 |
| 6,385,583 | B1 | * | 5/2002 | Ladd et al. | 704/270 |
| 6,456,974 | B1 | * | 9/2002 | Baker et al. | 704/270.1 |
| 6,490,601 | B1 | * | 12/2002 | Markus et al. | 715/207 |
| 6,658,414 | B2 | * | 12/2003 | Bryan et al. | 707/9 |

(Continued)

OTHER PUBLICATIONS

Waibel, A., Suhm, B., Vo, M.T. and Yang, J.,"Multimodal Interfaces for Multimedia Information Agents," Proceedings of 1997 ICASSP.*

(Continued)

*Primary Examiner* — Richemond Dorvil
*Assistant Examiner* — Greg Borsetti
(74) *Attorney, Agent, or Firm* — Wolf, Greenfield & Sacks, P.C.

(57) ABSTRACT

A computer-implemented method and system are provided for filling a graphic-based form field in response to a speech utterance. The computer-implemented method includes generating a grammar corresponding to the form field, the grammar being based on a user profile and comprising a semantic interpretation string. The method further includes creating an auto-fill event based upon the at least one grammar and responsive to the speech utterance, the auto-fill event causing the filling of the form field with data corresponding to the user profile. The system includes a grammar-generating module for generating a grammar corresponding to the form field, the grammar being based on a user profile and comprising a semantic interpretation string. The system also includes an event module for creating an auto-fill event based upon the at least one grammar and responsive to the speech utterance, the event causing the filling of the form field with data corresponding to the user profile.

8 Claims, 11 Drawing Sheets

U.S. PATENT DOCUMENTS

| | | | | |
|---|---|---|---|---|
| 6,856,960 | B1* | 2/2005 | Dragosh et al. | 704/270.1 |
| 6,898,567 | B2* | 5/2005 | Balasuriya | 704/231 |
| 6,975,993 | B1* | 12/2005 | Keiller | 704/275 |
| 7,003,464 | B2* | 2/2006 | Ferrans et al. | 704/270.1 |
| 7,050,977 | B1* | 5/2006 | Bennett | 704/270.1 |
| 7,076,428 | B2* | 7/2006 | Anastasakos et al. | 704/270.1 |
| 7,146,323 | B2* | 12/2006 | Guenther et al. | 704/275 |
| 7,167,824 | B2* | 1/2007 | Kallulli | 704/8 |
| 7,177,814 | B2* | 2/2007 | Gong et al. | 704/270.1 |
| 7,200,559 | B2* | 4/2007 | Wang | 704/257 |
| 7,216,351 | B1* | 5/2007 | Maes | 719/328 |
| 7,260,535 | B2* | 8/2007 | Galanes et al. | 704/270 |
| 7,382,770 | B2* | 6/2008 | Bergman et al. | 370/352 |
| 2002/0054090 | A1* | 5/2002 | Silva et al. | 345/747 |
| 2002/0059073 | A1* | 5/2002 | Zondervan et al. | 704/270.1 |
| 2002/0091520 | A1* | 7/2002 | Endo et al. | 704/235 |
| 2002/0093530 | A1* | 7/2002 | Krothapalli et al. | 345/745 |
| 2002/0107918 | A1* | 8/2002 | Shaffer et al. | 709/203 |
| 2002/0165719 | A1* | 11/2002 | Wang et al. | 704/270.1 |
| 2002/0193990 | A1* | 12/2002 | Komatsu | 704/235 |
| 2002/0198719 | A1* | 12/2002 | Gergic et al. | 704/270.1 |
| 2003/0028792 | A1* | 2/2003 | Plow et al. | 713/193 |
| 2003/0033146 | A1* | 2/2003 | Morin et al. | 704/251 |
| 2003/0088421 | A1* | 5/2003 | Maes et al. | 704/270.1 |
| 2003/0115060 | A1* | 6/2003 | Junqua et al. | 704/235 |
| 2003/0140113 | A1 | 7/2003 | Balasuriya | |
| 2003/0153362 | A1* | 8/2003 | Goldsmith et al. | 455/566 |
| 2003/0182622 | A1* | 9/2003 | Sibal et al. | 715/511 |
| 2004/0113908 | A1* | 6/2004 | Galanes et al. | 345/418 |
| 2004/0128135 | A1* | 7/2004 | Anastasakos et al. | 704/270.1 |
| 2004/0138890 | A1* | 7/2004 | Ferrans et al. | 704/270.1 |
| 2004/0141011 | A1* | 7/2004 | Smethers et al. | 345/810 |
| 2004/0243393 | A1* | 12/2004 | Wang | 704/9 |
| 2005/0004800 | A1* | 1/2005 | Wang | 704/270.1 |
| 2005/0028085 | A1* | 2/2005 | Irwin et al. | 715/513 |
| 2005/0171762 | A1* | 8/2005 | Ryan et al. | 704/200 |
| 2006/0167686 | A1* | 7/2006 | Kahn | 704/235 |
| 2006/0265225 | A1* | 11/2006 | Ichnowski | 704/257 |

OTHER PUBLICATIONS

Agarwal, R., Y. Muthusamy, and V. Viswanathan (1998), "Voice Browsingthe Web for Information Access," Media Technologies Lab, TexasInstruments Incorporated.*

Fischer V, Gunther C, Ivanecky J, Kunzmann S, Sedivy J, Ures L (2002) Towards multi-modal interfaces for embedded devices. In: Hoffmann R (ed) Elektronische Spachsignalverarbeitung—Tagungsband der 13. Konferenz, Reihe: Studientexte der Sprachkommunikation, Bd 24. w.e.b. Universitatsverlag, Dresden.*

Axelsson, J et al. "XHTML+Voice Profile 1.2" http://www.voicexml.org/specs/multimodal/x+v/12/spec.html, Mar. 16, 2004.*

Luc Van Tichelen. "Semantic Interpretation for Speech Recognition" http://www.w3.org/TR/2004/WD-semantic-interpretation-20041108/, Nov. 8, 2004.*

A. Hunt, S. McGlashan. Speech Recognition Grammar Specification Version 1.0 W3C Recommendation Mar. 16, 2004.*

Developing Multimodal Applications using XHTML+Voice, IBM Pervasive Computing. Jan. 2003.*

U.S. Appl. No. 10/849,642, filed May 19, 2004, Cross, et al.

U.S. Appl. No. 10/870,517, filed Jun. 17, 2004, Ativanichayaphong, e.

U.S. Appl. No. 10/945,112, filed Sep. 20, 2004, Ativanichayaphong, e.

"Naturally Speaking Professional", Image Management, LLC, viewed Feb. 28, 2004.

"OmniForm Premium 5.0", ScanSoft, 2004.

Axelsson, J., et al., "XHTML +Voice Profile 1.2", Mar. 16, 2004.

* cited by examiner

US 7,953,597 B2

METHOD AND SYSTEM FOR VOICE-ENABLED AUTOFILL

CROSS-REFERENCE TO RELATED APPLICATIONS

The present continuation-in-part application claims the benefit of U.S. patent application Ser. No. 10/945,112 filed Sep. 20, 2004, which is incorporated in its entirety herein by reference.

BACKGROUND

1. Field of the Invention

The present invention relates to multimodal browsers and voice servers and, more particularly, to voice-enabled multimodal applications for multimodal browsers and voice servers.

2. Description of the Related Art

Recent developments, many founded on the data-description eXtensible Markup Language (XML), have given rise to new Web-based applications including multimodal interfaces or browsers. A multimodal browser allows a user to access multimodal content, content that can be both graphical and audible. Traditionally, the user accessed Web content utilizing graphic input from a keyboard or manually directed screen-pointer entry. Later, the user also was been able to utilize speech input. More recently, the user has been able to access Web content through multimodal interfaces which permit the use of both graphic and speech inputs.

One type of multimodal browser is provided by the eXtensible Hypertext Markup Language (XHTML or XML)+Voice eXtensible markup language (VXML), also denoted more succinctly as the X+V markup language. The X+V markup language extends the traditional graphic browser to include spoken interactions. The X+V markup language integrates XHTML and XML-events technologies with XML vocabularies that were developed as part of the World Wide Web Consortium (W3C) Speech Interface Framework. The integration includes voice modules that support speech synthesis, speech dialogs, command and control applications, and speech grammars. Voice handlers can be attached to XHTML elements and respond to specific Document Object Model (DOM) events of a visual browser.

Notwithstanding these developments, a number of user desirable capabilities are not present in conventionally implemented multimodal interfaces, such as a user-friendly capability to fill form fields based upon speech utterances. Forms requiring user input have become commonplace. For example, users must commonly complete a form before being granted access privileges to enter a secure Web site. Inputting form information can be tedious, time consuming, and even frustrating. This can be especially true for a user who repetitively accesses content from various Web sites, each of which requires form-based input of user data before access is allowed. Moreover, the user may be using a device to access Web content that has limited or inconvenient input options. For example, a telephone, mobile phone, personal digital assistant (PDA), or similar type device often includes only a limited array of keys, a very small keypad, or nothing other than a voice input mechanism. It is desirable, therefore, that multimodal browsers be extended to provide an efficient way of voice enabling the automatic filling of form fields.

SUMMARY OF THE INVENTION

The present invention provides a computer-implemented method of automatically filling a form field in response to a speech utterance. The method can include the step of generating at least one grammar corresponding to the form field. The grammar can be based on a user profile and can include a semantic interpretation string. The method further can include the step of creating an event. The event can be based upon the at least one grammar and can be responsive to the speech utterance. The event can cause the filling of the form field with data corresponding to the user profile.

According to another embodiment, the present invention provides a computer system for automatically filling a form field in response to a speech utterance. The system can include a grammar-generating module that generates at least one grammar corresponding to the form field. The grammar can be based on a user profile and can comprise a semantic interpretation string. The computer system also can include an event module that creates an event that is based upon the at least one grammar and that is responsive to the speech utterance. The event can induce the filling of the form field with data corresponding to the user profile.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION

Figure 1:
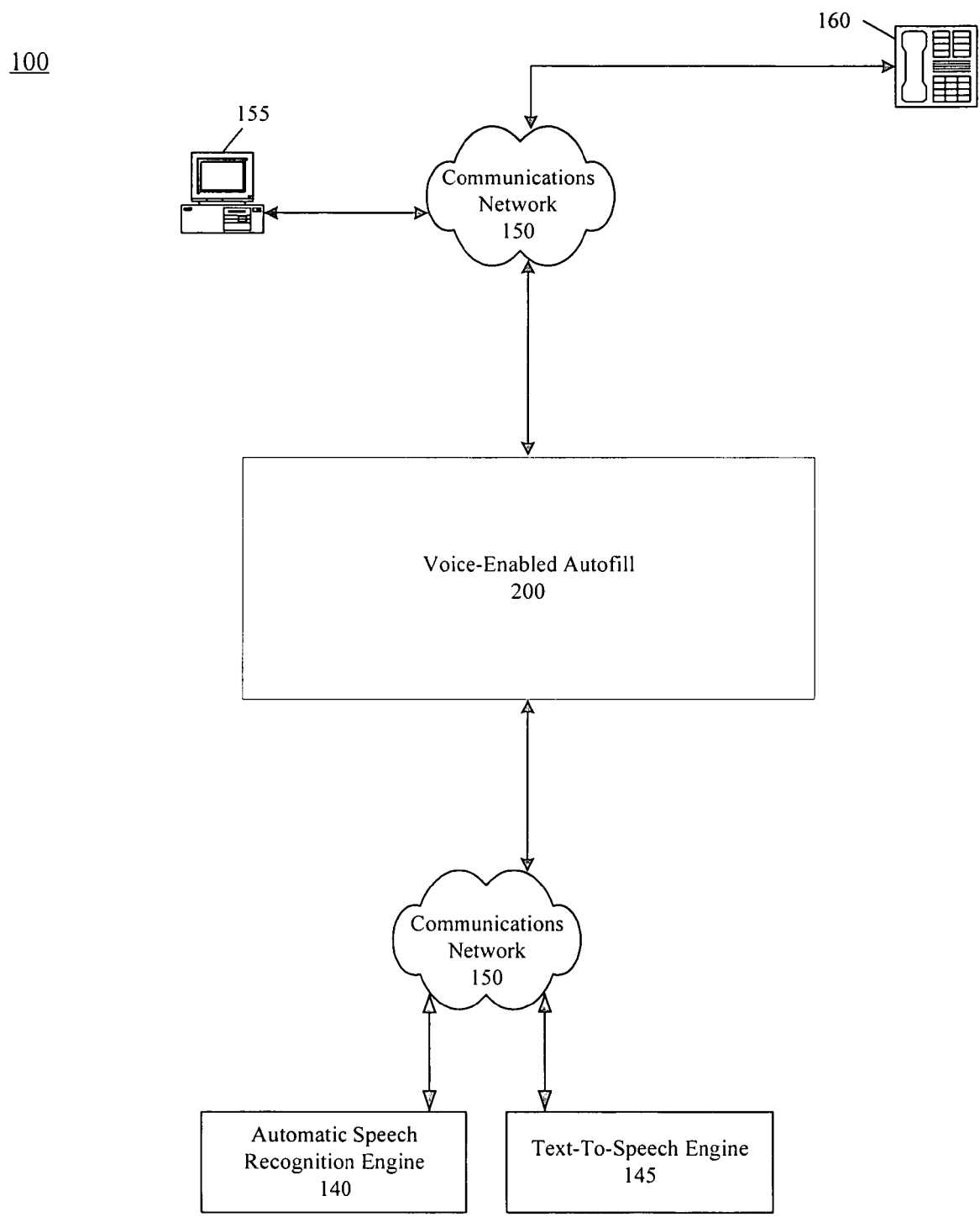
FIG. 1 is a schematic diagram illustrating a multimodal communication environment in which a system according to one embodiment of the present invention can be used.

FIG. 1 is a schematic diagram illustrating a multimodal communications environment 100 in which a system 200 for automatically filling a form field in response to a speech utterance can be used, according to the present invention. As illustrated, the multimodal communication environment 100 can include speech processing resources such as an automatic speech recognition (ASR) engine 140 and a text-to-speech (TTS) engine 145, each of which can electronically communicate with the system 200 via a communications network 150. The communications network 150 can include, but is not limited to, a local area network, a wide area network, the public switched telephone network, a wireless or mobile communications network, or the Internet. Illustratively, the system 200 is also able to electronically communicate via another or the same communications network 150 to a computer system 155 and to a telephone 160.

It will be readily apparent from the ensuing description that the illustrated multimodal communications environment 100 is but one type of multimodal communications environment in which the system 200 can be advantageously employed. Alternative multimodal communications environments, for example, can include various subsets of the different components illustratively shown.

Figure 2:
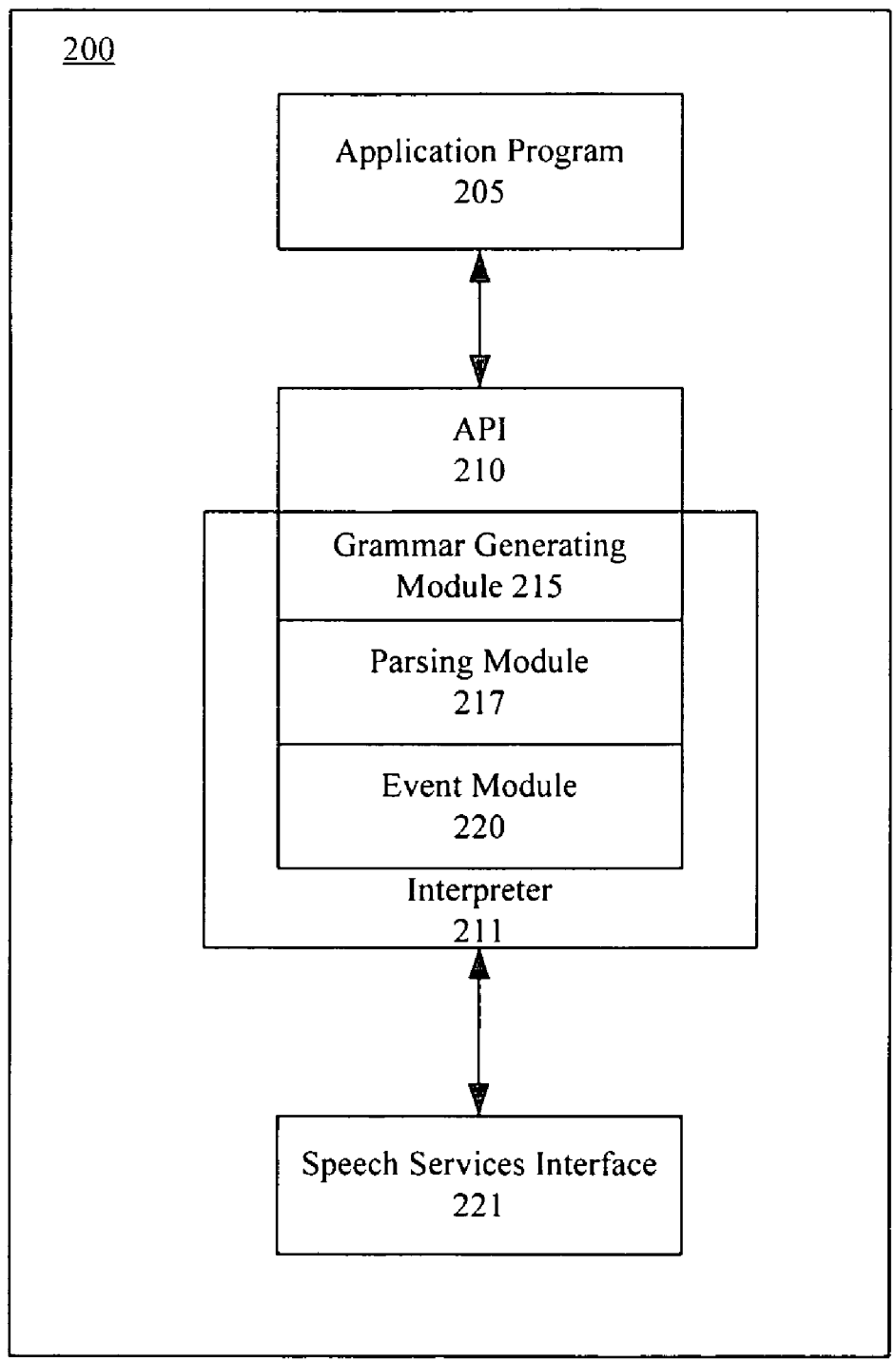
FIG. 2 is a schematic diagram of a system according to one embodiment of the present invention.

Referring additionally to FIG. 2, the system 200 illustratively includes an application program 205 and an application program interface (API) 210 through which the application program is linked to an interpreter 211. Within the interpreter 211, the system 200 also illustratively includes a grammar generating module 215, and an event module 220 that are connected via the API 210 to the application program 205. The grammar generating module 215 and the event module 220 can run in the same address space as the application 205. The system also includes a speech services interface 221 that connects to the speech browser. More generally, the speech services interface 221 can connect to any of various audio resources (not shown) such as an audio subsystem and speech processing resources such as an automatic speech recognition (ASR) engine and a text-to-speech (TTS) engine. The system 200, accordingly, can function as a server for hosting one or more applications such as a voice browser, interactive voice response system, voice server, or other type of application. For example, the application 205 can also function as a visual browser that is to be voice or speech enabled.

The system 200 additionally includes a parsing module 217 that parses a document written in a VoiceXML and determines whether the document contains a synchronized voice field in a user profile domain. The term synchronized voice field is used herein to denote a form field which is filled by the synchronizing of speech and graphic inputs. As described below, this synchronization results in the filling of the form field with graphic input in response to a speech input. The term user profile domain is used herein to denote those form fields that are to be filled with data corresponding to a user profile, the user profile denoting for example, personal data corresponding to the user. Such personal information can include the user's name, address and phone number Other types of data alternately can be contained in the user profile and, accordingly, can be the subject of a voice-enabled auto-fill without changing the present invention as described herein.

The user profile in the present context illustratively includes a Key, Label Phrase, and Value, as shown by the representative user profile scheme in Table 1.

TABLE 1

| KEY | LABEL PHRASE | VALUE |
| --- | --- | --- |
| "firstname" | "my first name" | "Gerald" |
| "lastname" | "my last name" | "McCobb" |
| "address" | "my address" | "8051 Congress Avenue" |

The API 210 provides a VoiceXML field grammar that implements a synchronization element, such as the X+V <sync> element. The synchronization element implemented by the VoiceXML field grammar synchronizes the value property of a graphic input control, such as an XHTML input control, with the synchronized voice field. As noted above, in the present context, the synchronized voice field defines the form field that is to be automatically filled, or auto-filled, by the system 200.

Figure 3:
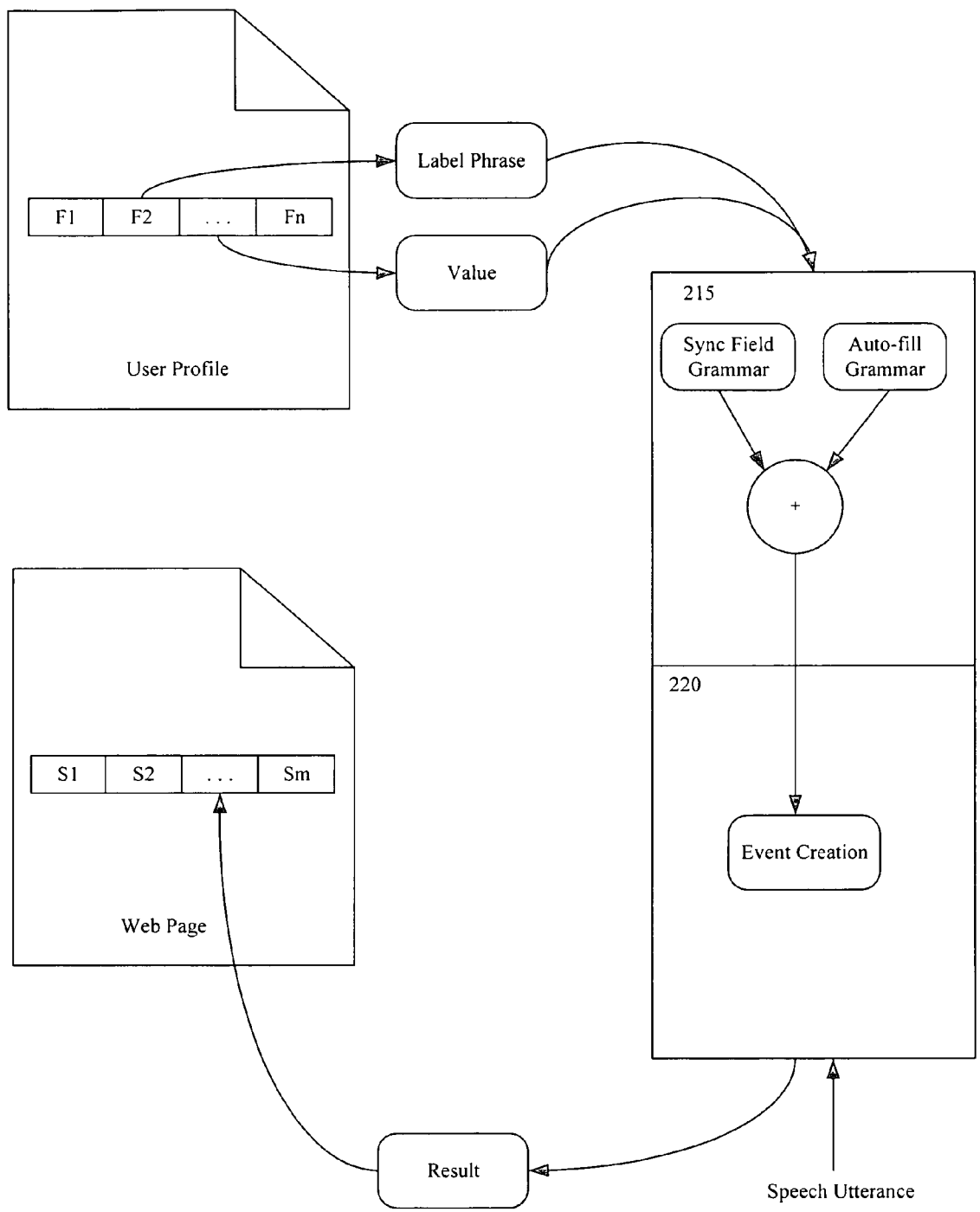
FIG. 3 is a schematic diagram of operations performed by the system of FIG. 2.

The grammar-generating module 215 can comprise a VoiceXML interpreter. As illustrated in FIG. 3, the grammar-generating module 215 obtains from the user profile the label phrase and corresponding value that is to be auto-filled in a particular one of the identified form fields. The grammar-generating module 215 generates an additional grammar, denoted as an auto-fill grammar, based upon the label phrase and having semantic interpretation (SI) string or tag that contains the value corresponding to the label phrase. The grammar-generating module performs this operation for each form field identified by the parsing module 217 as a synchronized voice field in the user profile domain. Thus, the grammar-generating module 215 generates an auto-fill grammar corresponding to each synchronized voice field defining a form field, the grammar being based on the user profile and including the SI string or tag.

When one of the form fields so identified is accessed by a form interpretation algorithm (FIA), the grammar-generating module 215 enables the auto-fill grammar along with the VoiceXML field grammar provided by the API 210. When the auto-fill grammar and the VoiceXML field grammar are enabled, the event module 220 creates an auto-fill event based upon the grammars. The event is configured to respond to a speech utterance.

The auto-fill event, in response to the speech utterance, causes an execution of the SI string or tag so that the result of the execution is the value corresponding to the label. The auto-fill event causes the result to be propagated, and the synchronization element implemented by the VoiceXML field grammar fills in the form field of the Web page with the result of the SI string or tag execution. Accordingly, the event causes the form field to be filled with the value contained in the semantic interpretation string in response to the speech utterance.

Figure 4:
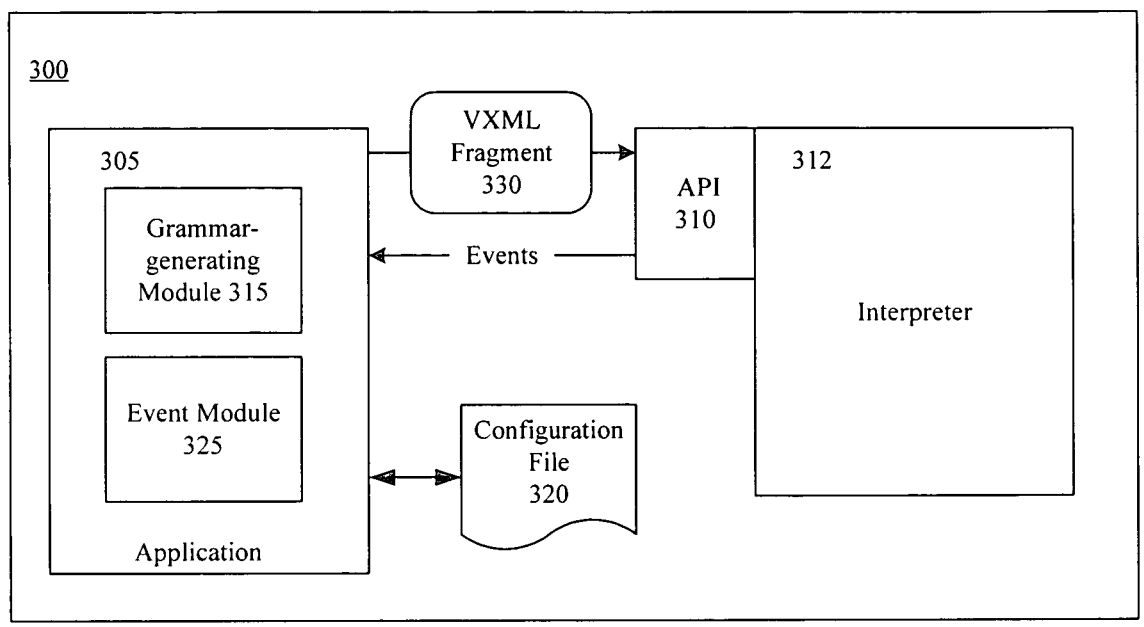
FIG. 4 is a schematic diagram of a system according to another embodiment of the present invention.

FIG. 4 is a schematic diagram of a system 300 for automatically filling a form field in response to a speech utterance according to another embodiment of the present invention. The system includes an application program 305 and an interpreter 312, the application program and interpreter being connected via an API 310. The system also includes a grammar-generating module 315 and an event module 325. As illustrated, the a grammar-generating module 315 and an event module 325 are part of the interpreter 312.

The application program 305 can generate and pass a VoiceXML fragment 330 to the interpreter 312. The VoiceXML fragment 330 can specify a grammar that can be used to process received speech utterances. In case multiple devices are enabled for multimodal interaction, a configuration file 320 can be optionally included to specify one or more different devices such as a telephone, mobile phone, home security system, dashboard audio/communication system, computer system, and portable computer system. Within the configuration file 320, each device can be assigned an identifier that uniquely identifies that device. In one embodiment, prior to registering the VoiceXML fragment 330 with the interpreter 312, the application 305 can access the configuration file 320 to obtain the identity of the device being used.

The system 300 utilizes a command, control, and content navigation markup language (C3N), in which the application program 305 registers a VoiceXML link, based upon C3N grammars, such as a VoiceXML <link>, with the interpreter 312. Events generated by matching grammars in the link are propagated back to the application program 305 as shown. By specifying one or more link elements, based upon C3N grammars and denoted C3N link grammars, speech inputs to the application 305 can be matched. That is, the interpreter 312 can match speech inputs received from the application 305 with the C3N link grammars. Upon detecting a match, the interpreter 312 can generate one or more events that are sent back to the application 305.

Figure 5:
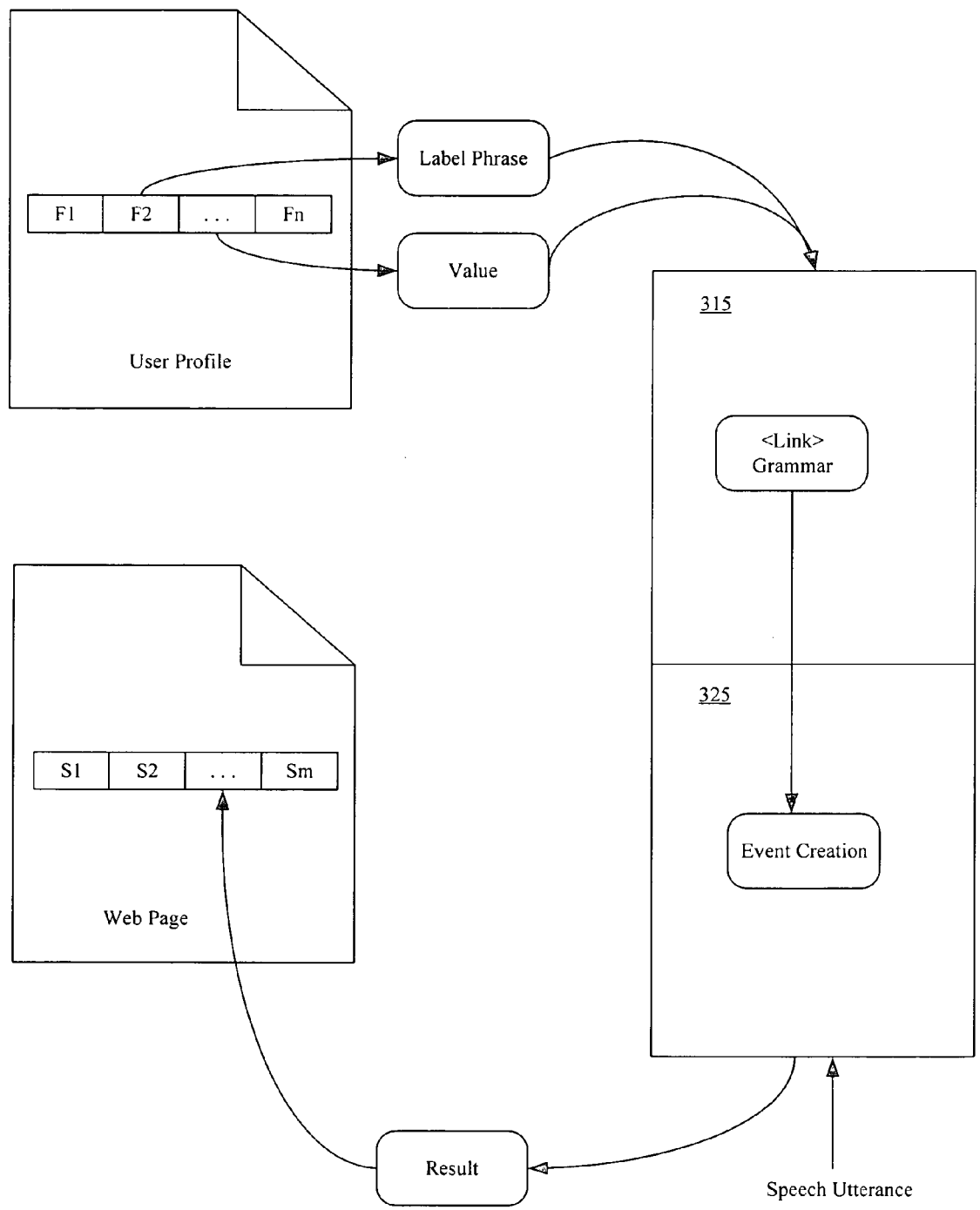
FIG. 5 is a schematic diagram of operations performed by the system of FIG. 4

More particularly, as illustrated in FIG. 5, a C3N link grammar is generated by the grammar-generating module 315 when an auto-fill is required. The C3N link grammar is based upon the user profile. The application program 305 then instructs the interpreter 312 to add the C3N link grammar. The C3N link grammar causes the event module 325 to create an auto-fill event. When executed in response to a speech utterance the event causes the form field to be filled by graphic input from the user profile.

For example, assuming the same user profile as set forth above, the following VoiceXML-based application uses the Key, Label Phrase, and Value elements to generate a grammar in accordance with this embodiment:

```
<vxml:link eventexpr+"application.lastresult$.interpretation.c3n>
    <grammar>
        <![CDATA[
        #JSGF V1.0
        grammar user_profile;
        public <user_profile> + Browser fill [my]
        (
            first name {$.c3n = "command.autofill.firstname";}
            I last name {$.c3n = "command.autofill.lastname";}
            I street address {$.c3n = "command.autofilladdress";}
        )
        ;
        ]]>
    </grammar>
</vxml:link>.
```

The grammar is built using the label phrases and corresponding keys, which are included in a portion of a corresponding SI string or tag. The grammar is illustratively constructed so as to match a phrase such as "fill my street address." The VoiceXML link in response to the speech utterance causes an event to be propagated. The system 300 responds to the event, which is interpreted as an auto-fill command, by searching the user profile to obtain the value for the address. The result is that the form field is auto-filled with the value "8051 Congress Avenue."

Figure 6:
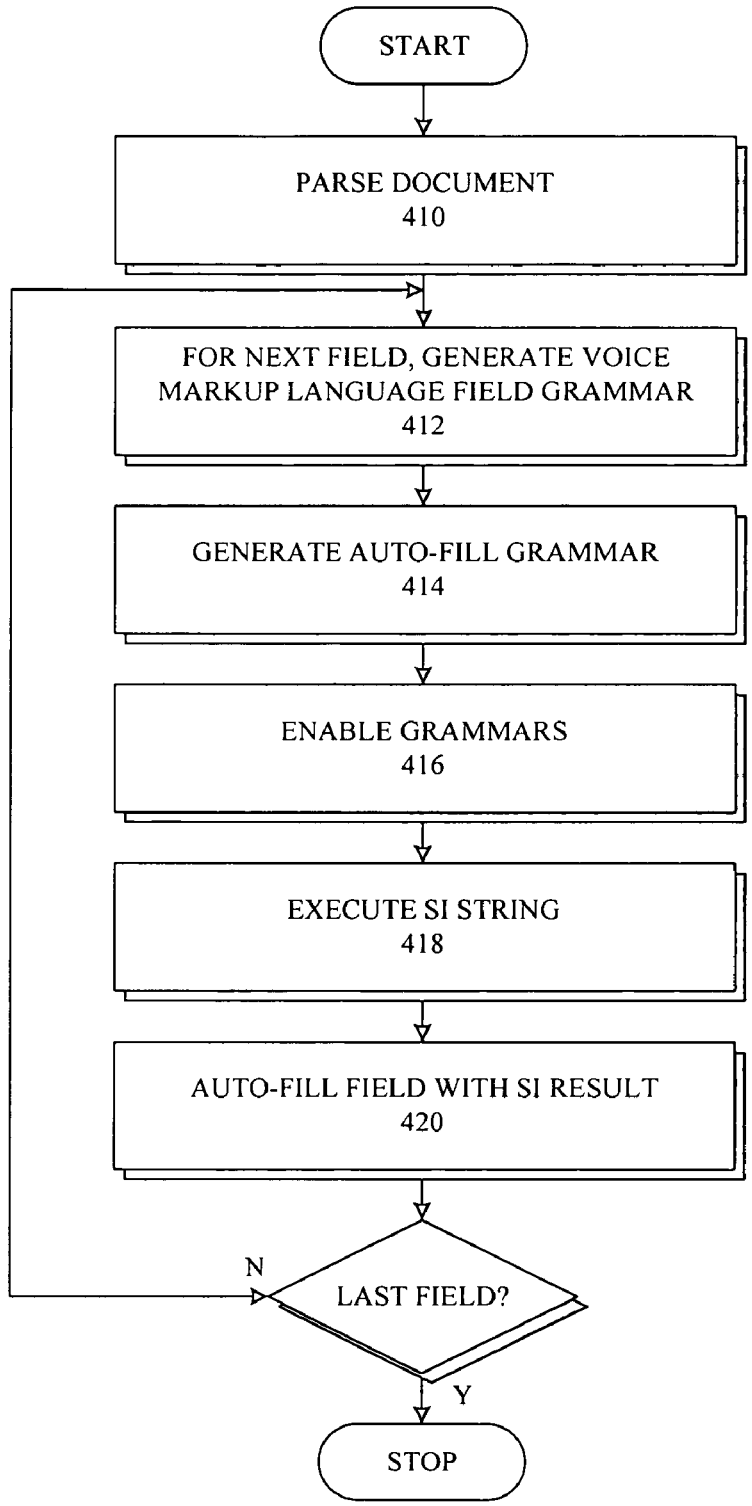
FIG. 6 is a flowchart illustrating a method according to one embodiment of the present invention.

FIG. 6 provides a flowchart illustrative of a method 400 according to yet another embodiment of the present invention. The method 400 begins at step 410 in which a document is parsed to determine whether to determine whether an X+V document contains a synchronized voice field in a user profile domain. For each field, a VoiceXML field grammar is generated at step 412.

At step 414, an auto-fill grammar is generated based upon the label phrase and corresponding value of a user profile, the value being contained in an SI string or tag. The VoiceXML field grammar and the auto-fill grammars are enabled at step 416. In response to a speech utterance, the SI string is executed so that the result is the value contained in the SI string or tag at step 418. A visual field, at step 420, is auto-filled with the result.

Figure 7:
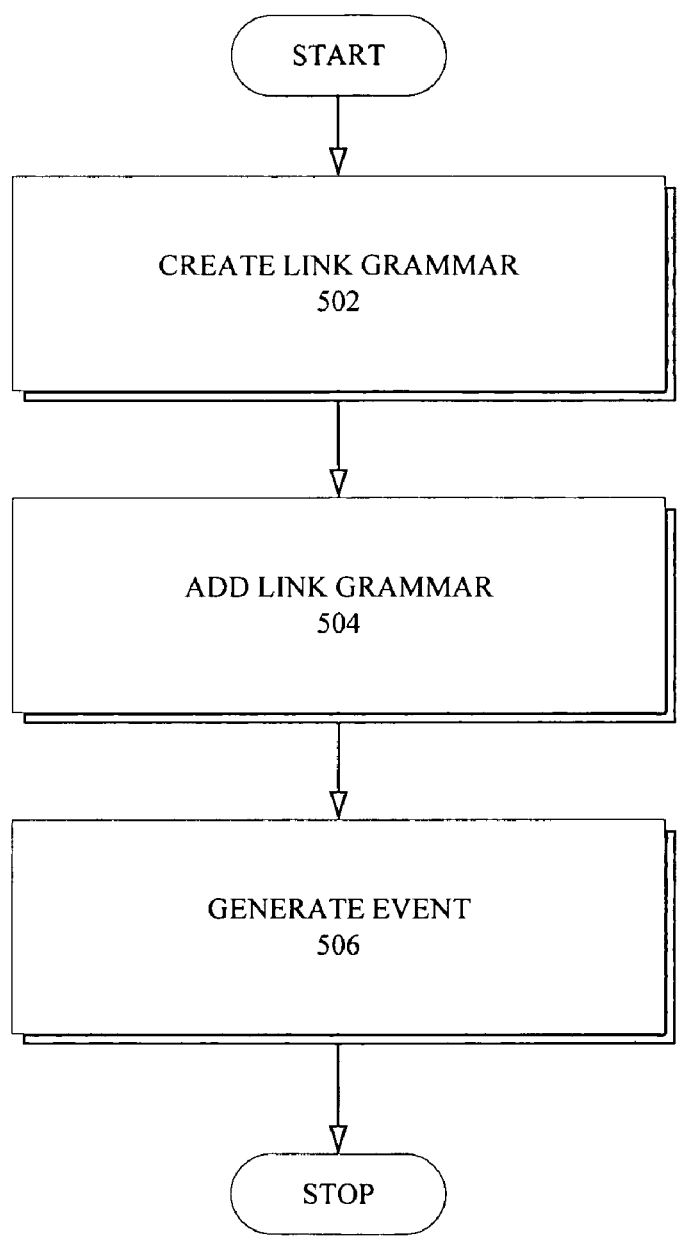
FIG. 7 is a flowchart illustrating a method according to another embodiment of the present invention.

FIG. 7 provides a flowchart illustrative of a method 500 according to still a different embodiment of the present invention. In step 502, a link grammar with fields corresponding to the user profile is created. The link grammar is added by an interpreter at step 504. The link generates an event at step 506 in response to a speech utterance and when a field in a page has focus.

As already noted, a system according to the different embodiments described herein can operate in different capacities, including functioning as a browser having an auto-fill capability for filling the fields of a Web form with graphical content in response to a speech utterance. The auto-fill capability can be especially beneficial if the browser resides on a device with a small form factor, such as a mobile phone.

The multimodal auto-fill, as described above, typically employs a grammar based upon user information that is supplied to the browser. The user identification, as also already noted, can comprise a personal profile or other identifying indicia, as well as any other type of information that the user can conveniently enter via the multimodal auto-fill supported by a particular browser. When the user information on which such a grammar is based is to be with a device having a small form factor, however, the loading of the grammar on the device can be a difficult task. Moreover, some devices many not have adequate memory space for storing the information. A particular device also may not have the capability to support local speech recognition.

A way to overcome these obstacles is provided by another embodiment of the present invention. The particular embodiment permits the user of a browser to enter user information over a data communications network. Any type of data communications network can be employed ranging from a local area network (LAN), such as a wireless LAN (WLAN), to the Internet. The user information can be supplied via a personal computer (PC) or other computing device connected to the particular data communications network.

More particularly, the user information can be maintained in a user information dialog application that is stored at a predetermined location of a particular data communications network, such as at a secure Web site on the Internet. The dialog generates grammars corresponding to the user information. For example, the grammars can be stored on a Web site as a set of files in a standard format such as the Speech Recognition Grammar Specification (SRGS).

If the user's device supports local speech recognition, then the multimodal auto-fill grammars are downloaded to the device after the user logs onto the information dialog application using the device's browser. Later when, for example, the user accesses a Web form provided by another application requiring user information, the user fills in the form using the multimodal auto fill capability as described above.

Figure 8:
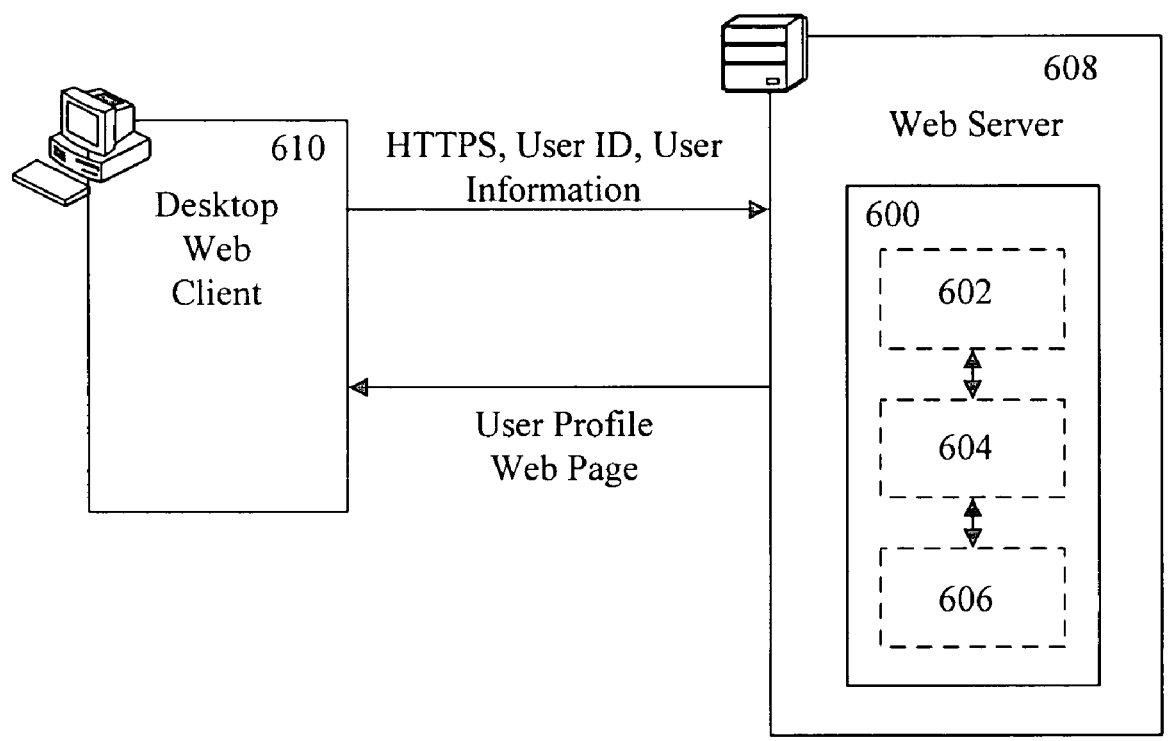
FIG. 8 is a schematic diagram of an application dialog for supporting a multimodal auto-fill, according to yet another embodiment of the present invention.

FIG. 8 provides a schematic diagram of a user-information dialog application 600, according to one particular embodiment. The operations performed by the dialog 600 support a multimodal auto-fill performed by a user using a device that runs a web browser that supports multimodal applications and that is also capable of speech recognition. The dialog application 600 illustratively includes a grammar generation module 602 that generates grammars based upon user-specific information. Illustratively, the dialog application 600 further includes a grammar storage module 604 that stores the grammars generated, and a grammar conveyance module 606 for conveying the generated grammars to a remotely located multimodal application accessed by the user.

The dialog application 600 illustratively resides on a Web server 608. The user provides the user-specific information to the dialog application 600 from a client 610, such as a desktop Web client, via a data communications network connection between the client and the Web server 608. Subsequently, using any device that has speech recognition capability as well as auto-fill capability, the user links to the dialog application 600 using the device's browser and downloads from the grammar storage module 604 the grammars that are stored thereon. When the user later accesses a Web form provided by some other application that requests user-specific information, the user fills in the form using the multimodal capability.

Table 2 is illustrative of user-specific information that can comprise a user profile.

TABLE 2

| Key | Label Phrase | Value |
| --- | --- | --- |
| "firstname" | "first name" | "Soonthorn" |
| "lastname" | "last name" | "Ativanichayaphong" |
| "address" | "street address" | "8051 Congress Ave" |
| "phone" | "phone number" | "561-666-1234" |

The following exemplary grammars can be generated by the grammar generation module 602 for the user-specific information in Table 2. Note that the format is the Java API Speech Grammar Format (JSGF) for representing speech grammars, but other grammars such as the W3C Speech Recognition Grammar Specification can alternately be used.

```
#JSGF V1.O;
grammar user_profile;
public <user_profile> = Browser fill [my]
  ( first name {$.c3n =         "command.autofill.firstname";}
                        | last name {$.c3n =
"command.autofill.lastname";}
                        | street address {$.c3n =
"command.autofill.address";}
                        | phone {$.c3n = "command.autofill.phone";}
                        ;
#JSGF V1.0;
grammar myfirstname;
public <myfirstname> = first name {$="Soonthorn"};
#JSGF V1.O;
grammar mylastname;
public <mylastname> = last name {$="Ativanichayaphong"};
#JSGF V1.O;
grammar mystreet;
public <mystreet> = street address {$="8051 Congress Ave"};
#JSGF V1.O;
grammar mystreet;
public <mystreet> = (telephone | phone) {$="561-555-1234"};
```

For a user device having a speech recognition capability, the above grammars are fetched after the user logs onto the web application using the device's web browser. These exemplary grammars can be stored by the Web application as separate grammar files that can be accessed using the following exemplary URL's:

http://www.example.com/autofill/grammars/gram1.jsgf
http://www.example.com/autofill/grammars/gram2.jsgf
http://www.example.com/autofill/grammars/gram3.jsgf
http://www.example.com/autofill/grammars/gram4.jsgf
http://www.example.com/autofill/grammars/gram5.jsgf.

Figure 9:
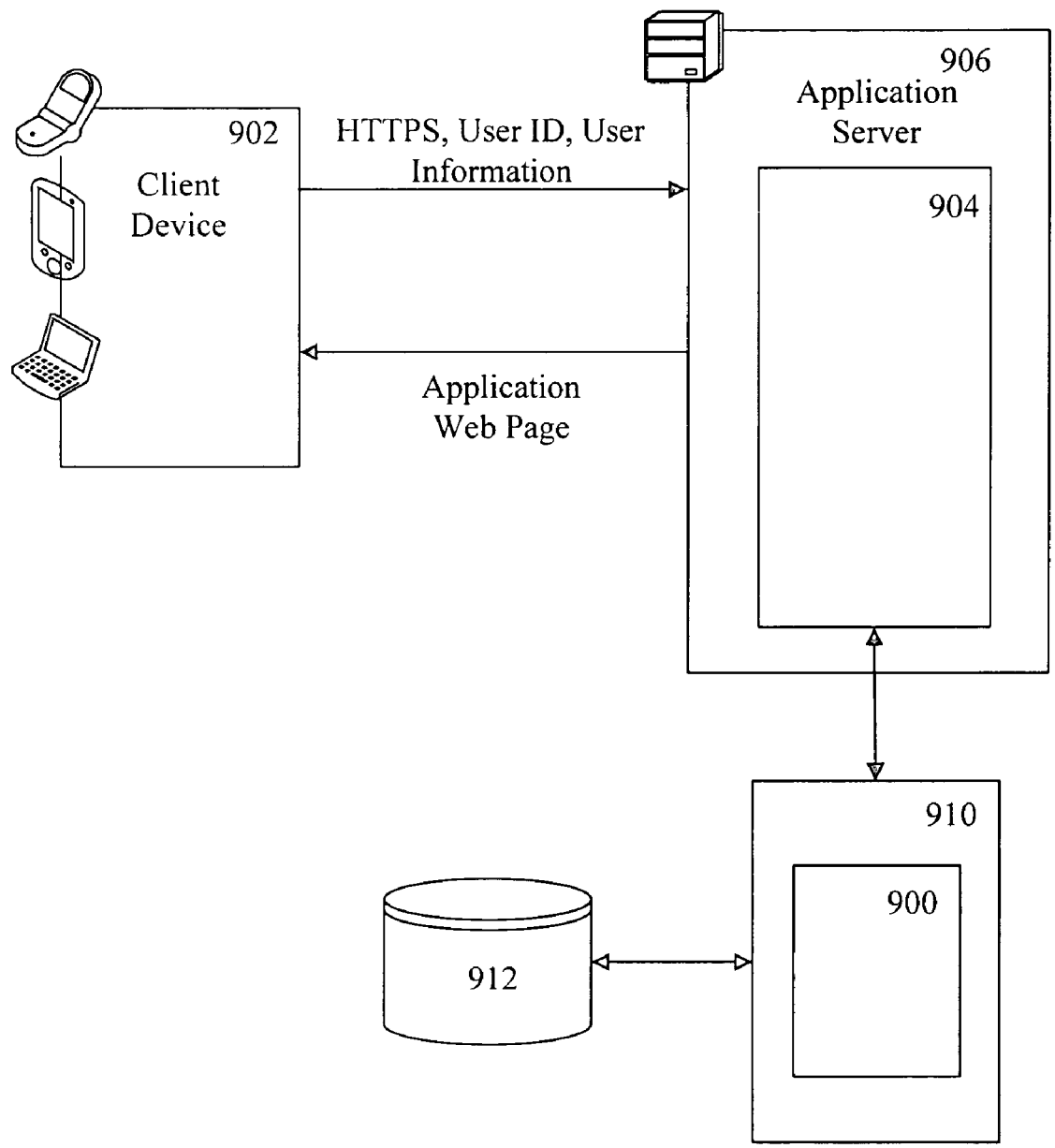
FIG. 9 is a schematic diagram of an application dialog for supporting a multimodal auto-fill, according to still another embodiment of the present invention.

An alternative embodiment of a user-information dialog application is schematically illustrated in FIG. 9. The dialog application 900 is specifically intended to be used in conjunction with a user device 902 that has a web browser that supports multimodal applications but lacks a speech recognition capability. When the user logs onto a remotely located multimodal application 904, residing, for example, on an application server 906, the dialog application 900 illustratively residing on a remote Web server 910 causes the network address where the grammars 912 are located to be conveyed to the multimodal application. The multimodal application 904, optionally using a particular user authentication mechanism, locates the grammars 912 located at the network address, retrieves the grammars 912 and provides them to a speech recognition engine located on the application server 906.

For example, the address can correspond to URL locations that are included with an HTTP request for a Web page, the request coming from the browser operating on the user device 902. More particularly, the request can contain an HTTP 1.1 content-location header, as will be readily understood by one of ordinary skill in the art. The multimodal application 904 receives the HTTP request and reads the URL contained within the content-location headers. The multimodal application 904 then fetches the grammars both generated and stored by the dialog application 900, and then supplies the grammars to a speech recognition engine (not explicitly shown) located on the application server 906. The multimodal auto-fill grammars are activated by the speech engine so that the grammars can be used in conjunction with the Web form response sent by the application to the user.

Note that for a user device that does not support local speech recognition, the URL's are downloaded after the user logs onto a web application using the Web browser running on the device. When the user later uses the Web browser to access a particular Web form provided by a remote multimodal application, the URL's are included with the HTTP 1.1 request for the Web page. The proposed HTTP 1.1 header to be used is content-location:

content-location http://www.example.com/autofill/grammars/gram1.jsgf
content-location http://www.example.com/autofill/grammars/gram2.jsgf
content-location http://www.example.com/autofill/grammars/gram3.jsgf
content-location http://www.example.com/autofill/grammars/gram4.jsgf
content-location http://www.example.com/autofill/grammars/gram5.jsgf.

The multimodal Web application reads the content-header information and fetches the grammars. Note further that, as alluded to above, the application server can use an authentication mechanism, which may require the client's tokens (i.e., "cookies") to be passed to the Web server storing the grammars. The tokens could contain the IP address of the user's small device, which is unique.

Figure 10:
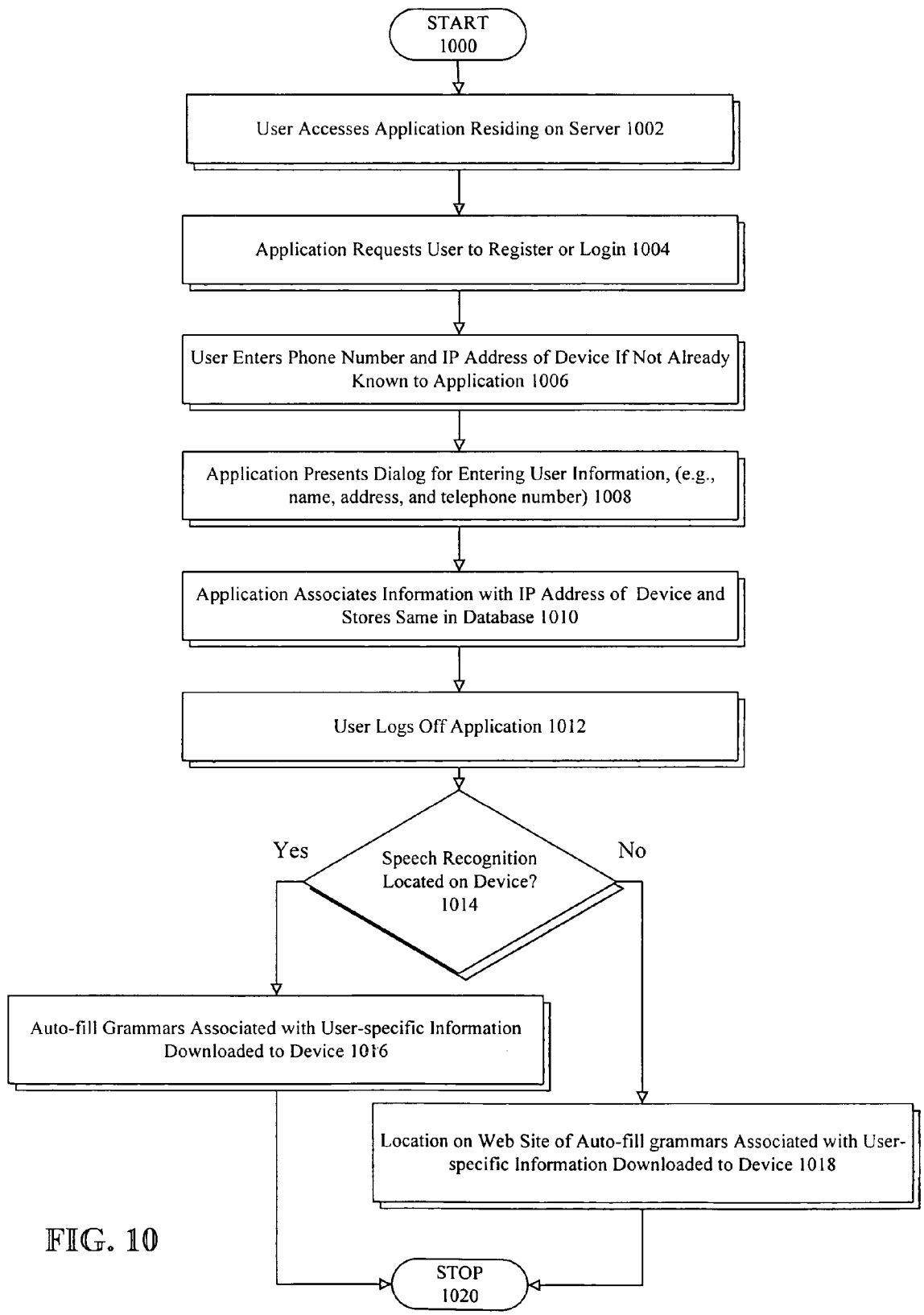
FIG. 10 is a flowchart of a method for registering user-specific information using an application dialog that supports a multimodal auto-fill, according to yet another embodiment of the present invention.

FIG. 10 is a flowchart illustrative of a method 1000 of registering user-specific information using an application dialog, according to yet another embodiment of the present invention. At step 1002, a user of a device that supports a multimodal Web browser accesses an application dialog residing on a server. The application dialog responds by requesting the user register with the application at step 1004. The user, in turn, responds at step 1006 by entering, for example, a telephone number and/or IP address of a device on which the user runs a Web browser.

At step 1008, the application presents a dialog for entering user-specific information, such as the user's name, address, and/or telephone number. The application associates the user-supplied information with the IP address of the user device and stores the associated data in a database at step 1010. The user can then log off from the application at step 1012.

A determination is illustratively made at step 1014 as to whether the particular device corresponding to the now-registered information has a speech recognition capability. If it does, then the auto-fill grammars are associated with the user-specific information are downloaded to the device at step

1016. Otherwise, at step 1018, the location on the Web site where the associated auto-fill grammars reside are downloaded to the device. The method illustratively concludes at step 1020.

Figure 11:
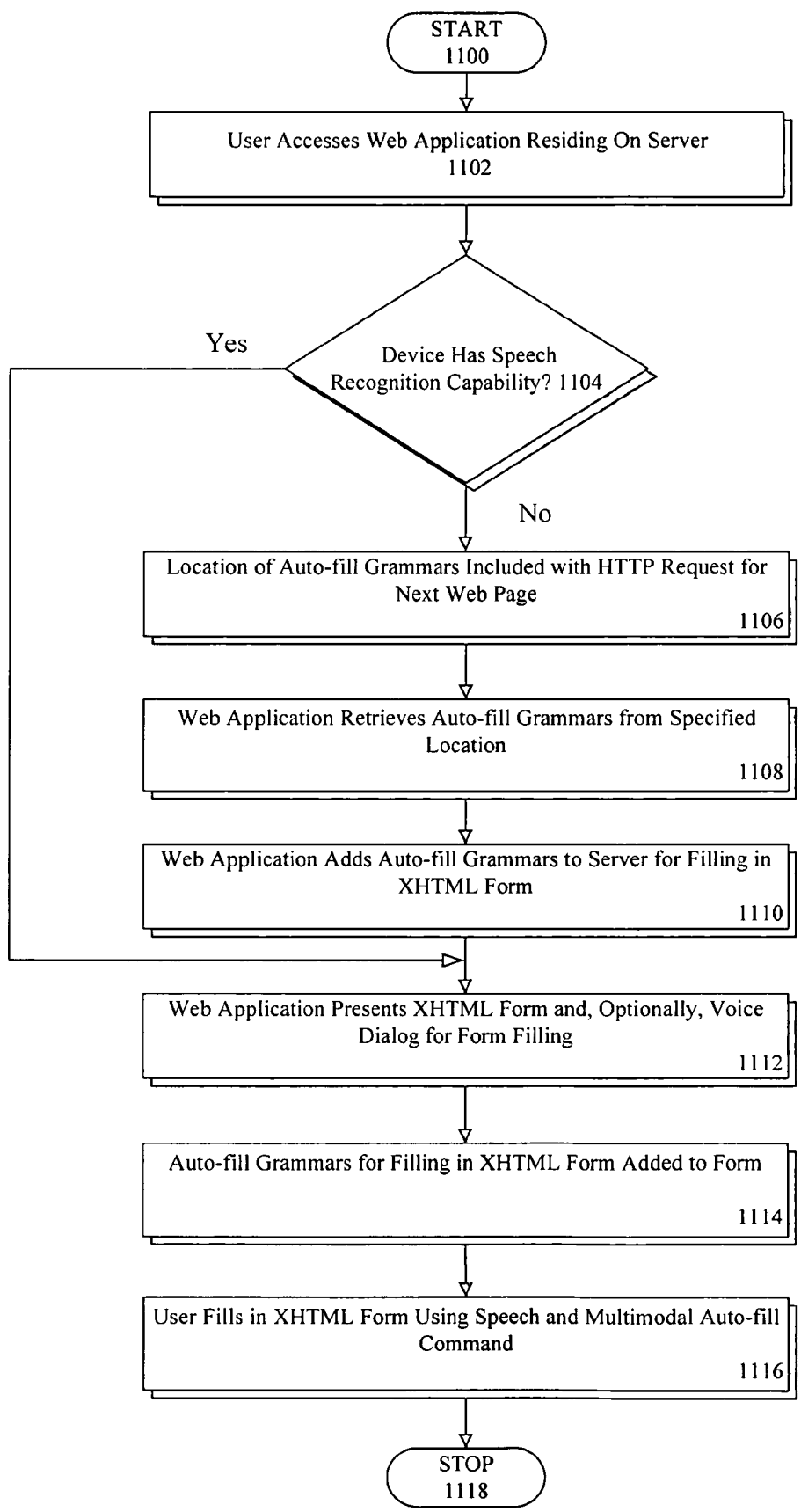
FIG. 11 is a flowchart of a method for accessing a Web form provided by a multimodal application using an application dialog that supports a multimodal auto-fill, according to yet another embodiment of the present invention.

FIG. 11 is a flowchart illustrative of a method 1100 of accessing a Web form using an application dialog, according to still another embodiment of the present invention. The user accesses a multimodal Web application at step 1102 using a device that supports multimodal interactions. If the device lacks speech recognition capability at step 1104, then at step 1106 the location of stored auto-fill grammars are provided in the request, such as a known HTTP request, for a next Web page. The Web application at step 1108 retrieves the grammars from the specified address, and at step 1110 adds the auto-fill grammars to its server in order to fill in a form formatted, for example, in XHTML.

If, however, the device does support speech recognition, then steps 1106-1110 can be circumvented. Regardless, the method continues at step 1112 with the Web application presenting an XHTML form and, optionally, a voice dialog for filling in the form. The grammars for filling in the form are added at step 1114, and various methods described above for performing an auto-fill are subsequently formed at step 1116. The method concludes at step 1118.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A computer-implemented method of automatically filling a form field in response to a speech utterance corresponding to a label phrase, the method comprising:
   generating at least one auto-fill grammar corresponding to the form field based, at least in part, on user-specific information, wherein the user-specific information comprises the label phrase and a semantic interpretation string corresponding to the label phrase;
   determining, in response to a user accessing a multimodal application via a browser on a user device, whether the user device has the speech recognition capability;
   downloading, in response to determining that the user device has the speech recognition capability, the at least one auto-fill grammar to the user device;
   downloading, in response to determining that the user device does not have a speech recognition capability, a location on a Web site where the at least one auto-fill grammar resides to the user device, wherein the user device provides the location of the at least one auto-fill grammar to a remotely-located speech recognition engine to facilitate speech recognition by the remotely-located speech recognition engine; and
   creating an auto-fill event based upon the at least one auto-fill grammar and responsive to the speech utterance corresponding to the label phrase, the auto-fill event causing the filling of the form field with the semantic interpretation string corresponding to the label phrase.

2. The method of claim 1, wherein the semantic interpretation string is retrieved from a record of a table specific to a stored user profile, the record establishing an association between the semantic interpretation string and the speech utterance.

3. The method of claim 1, wherein the form field is a synchronized voice form field of a voice markup language document, and wherein the generating step comprises generating at least one grammar defining a form field grammar corresponding to the synchronized voice form field.

4. The method of claim 3, further comprising parsing the voice markup language document to determine whether the voice markup language document contains the synchronized voice form field.

5. The method of claim 1, wherein the generating step comprises generating a voice command and control grammar and/or a content navigation grammar.

6. The method of claim 1, wherein the form field is a form field of a voice markup language document, and wherein the generating step comprises generating at least one grammar defining a link grammar corresponding to the form field.

7. A computer-implemented system of automatically filling a form field in response to a speech utterance corresponding to a label phrase, comprising:
   a processor programmed to perform a method comprising;
      generating at least one auto-fill grammar corresponding to the form field based, at least in part, on user-specific information, wherein the user specific information comprises the label phrase and a semantic interpretation string corresponding to the label phrase;
      determining, in response to a user accessing a multimodal application via a browser on a user device, whether the user device has a speech recognition capability;
      downloading, in response to determining that the user device has the speech recognition capability, the at least one auto-fill grammar to the user device;
      downloading, in response to determining that the user device does not have the speech recognition capability, a location on a Web site where the at least one auto-fill grammar resides to the user device, wherein the user device provides the location of the at least one auto-fill grammar to a remotely-located speech recognition engine to facilitate speech recognition by the remotely-located speech recognition engine; and
      creating an auto-fill event based upon the at least one auto-fill grammar-and responsive to the speech utterance corresponding to the label phrase, the auto-fill event causing the filling of the form field with the semantic interpretation string corresponding to the label phrase.

8. A non-transitory computer-readable storage medium encoded with a plurality of instructions that, when executed by a computer system, perform a method comprising:

generating at least one auto-fill grammar corresponding to a form field based, at least in part, on user-specific information, wherein the user-specific information comprises a label phrase and a semantic interpretation string corresponding to the label phrase;

determining in response to a user accessing a multimodal application via a browser on a user device, whether the user device has a speech recognition capability;

downloading, in response to determining that the user device has the speech recognition capability, the at least one auto-fill grammar to the user device;

downloading, in response to determining that the user device does not have the speech recognition capability, a location on a Web site where the at least one auto-fill grammar resides to the user device, wherein the user device provides the location of the at least one auto-fill grammar to a remotely-located speech recognition engine to facilitate speech recognition by the remotely-located speech recognition engine; and creating an auto-fill event based upon the at least one auto-fill grammar and responsive to a speech utterance corresponding to the label phrase, the auto-fill event causing the filling of the form field with the semantic interpretation string corresponding to the label phrase.

* * * * *